(12) United States Patent
Taagepera et al.

(10) Patent No.: US 8,875,744 B2
(45) Date of Patent: Nov. 4, 2014

(54) PROTECTIVE SHEATH FOR STRUCTURAL COMPONENTS

(75) Inventors: Jaan Taagepera, Benicia, CA (US); Edwin Hall Niccolls, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 69 days.

(21) Appl. No.: 13/535,558

(22) Filed: Jun. 28, 2012

(65) Prior Publication Data

US 2013/0000750 A1    Jan. 3, 2013

Related U.S. Application Data

(60) Provisional application No. 61/503,621, filed on Jul. 1, 2011.

(51) Int. Cl.
*F16L 57/04* (2006.01)
*F16L 59/06* (2006.01)

(52) U.S. Cl.
CPC ....... *F16L 57/04* (2013.01); *F16L 59/06* (2013.01)
USPC ............................ 138/110; 138/114; 138/157

(58) Field of Classification Search
USPC .................................. 138/114, 110, 113, 178
See application file for complete search history.

(56) References Cited

U.S. PATENT DOCUMENTS

| | | | |
|---|---|---|---|
| 3,955,556 A | 5/1976 | Pangborn et al. | |
| 4,501,302 A * | 2/1985 | Harwood | 138/113 |
| 4,590,652 A * | 5/1986 | Harwood | 29/890.08 |
| 4,619,292 A | 10/1986 | Harwood | |
| 5,103,609 A | 4/1992 | Thoreson et al. | |
| 5,327,945 A * | 7/1994 | Simpson et al. | 141/59 |
| 5,781,411 A | 7/1998 | Feenstra | |
| 6,109,305 A * | 8/2000 | Fujimoto et al. | 138/114 |
| 6,470,635 B2 | 10/2002 | Cornwall | |
| 6,732,481 B2 | 5/2004 | Stahl, Sr. | |
| 7,168,452 B2 * | 1/2007 | Sasaki et al. | 138/110 |
| 7,563,496 B2 | 7/2009 | Watson | |
| 7,581,362 B2 | 9/2009 | Vaughan | |

(Continued)

FOREIGN PATENT DOCUMENTS

| | | | |
|---|---|---|---|
| KR | 20049979425 A | 9/2004 | |
| WO | 2004013528 A1 | 2/2004 | |

OTHER PUBLICATIONS

U.S. Appl. No. 13/535,526, filed Jun. 28, 2012, Jaan Taagepera.

(Continued)

*Primary Examiner* — Patrick F Brinson
(74) *Attorney, Agent, or Firm* — Melissa Patangia

(57) ABSTRACT

A structural component system for containing a hot fluid, e.g., petroleum product, and methods to dissipate heat build-up in the structural component is disclosed. In one embodiment, the structural component is a composite pipe for carrying a hot fluid, e.g., petroleum products. The system comprises a protective sheath disposed around the structural component and forms an air space between the structural component and the sheath. The sheath has at least two gaps on its surface, with the gaps being sufficiently spaced apart to allow air flowing through the air space from one gap to another to dissipate heat build-up from the hot fluid contained within the structural component. In one embodiment, an intumescent material is applied near the gaps, which material expands when heated to a temperature in a fire to effectively close the gaps and protect the structural component from the fire.

10 Claims, 1 Drawing Sheet

(56) References Cited

U.S. PATENT DOCUMENTS

| | | |
|---|---|---|
| 2006/0182915 A1 | 8/2006 | Frost et al. |
| 2008/0006339 A1 | 1/2008 | Albrecht et al. |
| 2009/0223584 A1* | 9/2009 | Gray .......................... 138/109 |
| 2010/0094392 A1 | 4/2010 | Nguyen et al. |
| 2010/0266788 A1 | 10/2010 | Niccolls et al. |
| 2011/0079314 A1 | 4/2011 | Henry et al. |

OTHER PUBLICATIONS

PCT International Search Report and Written Opinion, International Application No. PCT/US2012/044524, dated Jan. 7, 2013.

U.S. Appl. No. 13/535,526, filed Jun. 28, 2012, Taagepera, et al.

* cited by examiner

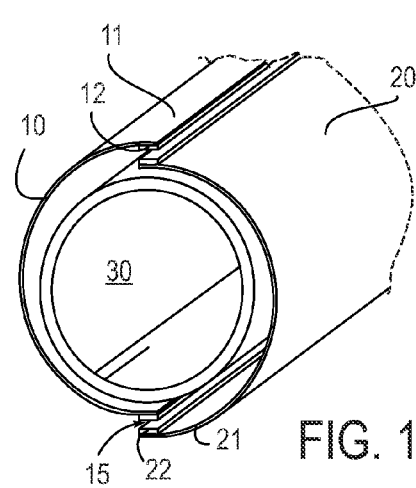
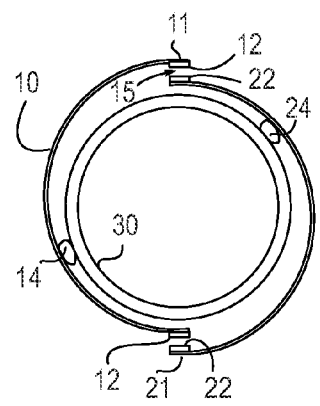
FIG. 1  FIG. 2
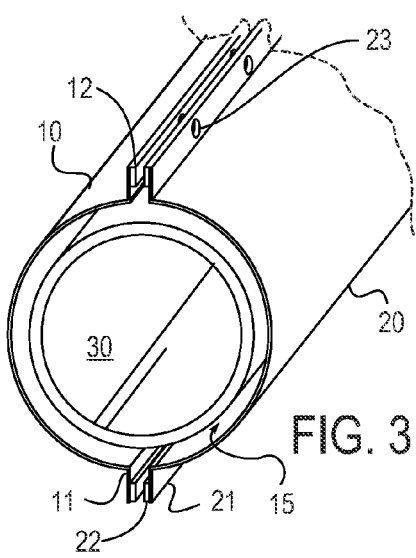
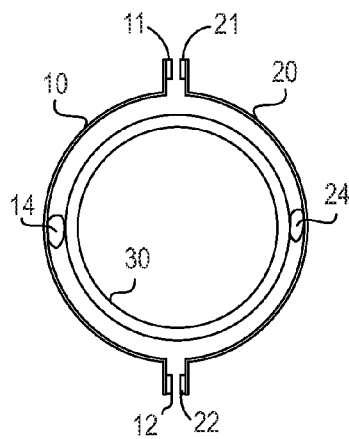
FIG. 3  FIG. 4
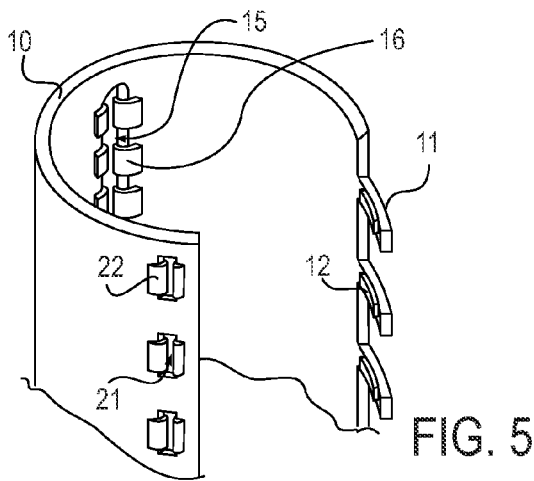
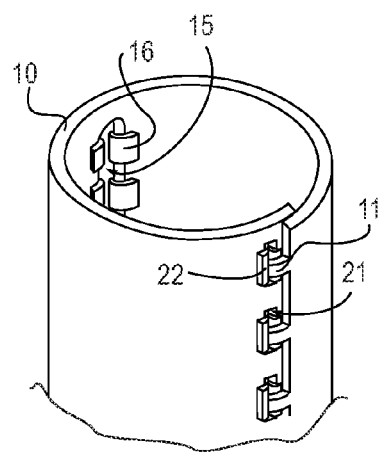
FIG. 5  FIG. 6 ions relates to a protective sheath for structural components such as vessels, equipment, piping systems, etc., and methods for providing protection for and/or heat dissipation in a structural component.

PROTECTIVE SHEATH FOR STRUCTURAL COMPONENTS

CROSS-REFERENCE TO RELATED APPLICATIONS

This application claims benefit under 35 USC 119 of U.S. Provisional Patent Application No. 61/503,621 with a filing date of Jul. 1, 2011. This application claims priority to and benefits from the foregoing, the disclosure of which is incorporated herein by reference.

TECHNICAL FIELD

The invention relates to a protective sheath for structural components such as vessels, equipment, piping systems, etc., and methods for providing protection for and/or heat dissipation in a structural component.

BACKGROUND

Structural components such as vessels, piping or tubing for carrying fluids such as petroleum products may require protection from fire damage depending on the fluid contained, the material of construction, and the location of the equipment. Conduit for use in containing instrumentation and electrical wirings may also need similar fire protection.

In the prior art, the usual approach for fire protection is to install insulation materials, e.g., polyurethane foam, intumescent coatings, fiberglass, calcium silicate insulation, etc., around the pipe or equipment. Application of an insulative fire-protection layer would help in the event of a fire with the side effect of heat retention within the equipment or piping, which can be beneficial if the intent is to keep the process fluid hot. Composite wrappings, e.g., non-yellowing fiberglass tapes pre-impregnated with a resin, have been used to provide UV protection for equipment and pipes. However, heat retention can be undesirable with the prior art approach, particularly for certain process equipment and under certain operating conditions, e.g., the use of composite materials for carrying process fluids such as petroleum products at high temperatures.

There is a need for an improved design and associated methods to provide protection for structural components from fire exposure, mechanical impact, vibration abrasion, fire exposure, heat damage, ultraviolet light, etc.

SUMMARY

In one aspect, the invention relates to a method to dissipate heat build-up in a structural component carrying a hot fluid. The method comprises: providing at least a structural component for containing the hot fluid, the structural component having an outer surface area; providing a protective sheath disposed around the structural component, creating an air space between the outer surface area of the structural component and the protective sheath, the non-insulating protective sheath having at least two openings, a first opening near or at a bottom side of the sheath and a second opening near or at a top side of the sheath; and dissipating heat build-up by creating a chimney effect from air drawn in through the first opening, passing through the air space over the structural component and exiting out the second opening In another aspect, the invention relates to a system for carrying a hot fluid, the system comprising: at least a structural component for containing the hot fluid; a protective sheath disposed around the structural component, forming an air space between the structural component and the protective sheath, the protective sheath having at least two gaps including a first gap and a second gap; wherein the gaps are sufficiently spaced apart to allow air flowing into the first gap through the air space and out of the second gap to dissipate heat from the hot fluid contained within the structural component.

In another aspect, the invention relates to a composite pipe system for carrying petroleum products, the pipe system comprising: at least a composite pipe for carrying the petroleum products; a protective sheath disposed around the composite pipe, forming an air space between the composite pipe and the protective sheath, the protective sheath comprising at least two half-pipe sections, and wherein each half-pipe section has two opposite seams each shaped at an angle such that the shaped seams from the two half-pipe sections in abutting position define a first gap and a second gap running longitudinally along full length of the protective sheath; intumescent adhesive material applied onto opposing sides of the shaped seams. In the pipe system, air flows into the first gap passes through the air space and out of the second gap to dissipate heat built-up. Furthermore, in a fire when the intumescent material is heated to an elevated temperature between 300 to 1200° F., the material fully expands to effectively close the gaps and protect the composite pipe from the fire.

BRIEF DESCRIPTION OF THE FIGURES

FIG. 1 is a perspective view of a pipe section including an embodiment of the protective sheath.

FIG. 2 is a cross-section view of the pipe section of FIG. 1.

FIG. 3 is a perspective view of a pipe section in a second embodiment of a protective sheath.

FIG. 4 is a cross-section view of the pipe section of FIG. 3.

FIG. 5 is a perspective view of a third embodiment of a protective sheath prior to assembly.

FIG. 6 is another perspective view of the protective sheath of FIG. 5 after it is assembled to be used on a pipe section.

DETAILED DESCRIPTION

The following terms will be used throughout the specification and will have the following meanings unless otherwise indicated.

"Petroleum products" refer to natural gas; natural and synthetic liquid hydrocarbon products including but not limited to biodegraded oils, crude oils, refined products including gasoline, other fuels, and solvents; and semi-solid/solid hydrocarbon products including but not limited to tar sand, bitumen, etc.

"Structural components" refer to containers, supporting members, structural supports, tubings, pipelines, pipe systems, vessels, reactors, transfer lines, process piping, processing equipment including but not limited to distillation columns, and the like for commerce including but not limited to chemical, petrochemical, and oil & gas industries. In one embodiment, the structural component is a section of pipe for transporting petroleum products.

"Contain" (or containing, or containment) means being used in an environment wherein process fluids are employed, or being in contact with process fluids such as petroleum products, which includes the transport, processing, handling, storage, shipping, and containment of process fluids, whether on a continuous, incidental, or intermittent basis.

"Thickness" refers to the average thickness of a layer.

"Composite" material refers to an engineered material made from two or more constituent materials with different physical or chemical properties and which remain separate and distinct on a macroscopic level within the finished structure. In one embodiment, the composite layer comprises a fiber material in a matrix, e.g., a fiber-reinforced plastic composite material, a fiber reinforced resin, glass-reinforced plastic or GRP, a fiber-reinforced ceramic matrix composite material, a metal matrix composite with a reinforcing fiber in a metal matrix, a glass fiber material in a glass ceramic composite, etc. Composite material comprising glass fiber in a plastic or ceramic matrix typically has a very low thermal conductivity compared to that of metals, e.g., fiberglass has a thermal conductivity of 2 BTU//ft$^2$-hr-° F.-in vs. a value of 320 BTU//ft$^2$-hr-° F.-in for steel.

A reference to "intumescent" or "intumescent material" is by want of exemplification of a material which upon heating to a temperature ranging from about 300 to 1200° F., expands to a dimension (e.g., thickness) that is at least 3 times the original dimension, which can be applied as a coating, a pad, an adhesive, a layer, or a sealant. In one embodiment, the material expands to 5-15 times its original volume. The intumescent material may comprise compositions with intumescent characteristics, e.g., graphite, sodium silicate, vermiculite, or blends thereof, or a blend of intumescent composition in other materials such as non-combustible fibrous materials or elastomeric materials.

A reference to "pipe," "pipe system," or "piping system" is by way of exemplification of a structural component, and not intended to exclude other equipment, equipment sections, in other forms or shapes such as vessels, or piping components and fittings such as elbows, tees, reducers, etc.

A reference to "hot" as in a hot process fluid means the fluid is at a temperature greater than ambient.

"Air space" refers to the space opening between the protective sheath and the equipment protected by the sheath. "Gap" (or "opening") refers to an opening formed on the surface of the protective sheath, or an opening on the surface of the protective sheath ("side opening" or "side hole").

One concern about structural components for containing or carrying hot process fluids such as petroleum products at high temperatures is the dissipation of heat due to the low thermal conductivity of composite materials. In composite pipe systems with the use of insulative materials for fire protection, heat does not dissipate but rather builds up over time. In one embodiment, the invention relates to a protective sheath that provides fire protection for the underlying equipment, while allowing heat dissipation or ventilation from the outer surface of the equipment under normal operating conditions. In another embodiment, the invention relates to a protective sheath that provides heat dissipation or ventilation from a chimney effect. The underlying equipment can be constructed from composite or metallic materials, and the protective sheath can be constructed from metallic or non-metallic materials.

In one embodiment for fire protection, the protective sheath is installed for the protection of the equipment prior to a fire event. It can be installed on the equipment after the system is in place, i.e., after all the equipment pieces are installed and connected together, or it can be installed as a component of the equipment to be installed.

The protective sheath can be of any shape or form, preferably in a shape conforming to the equipment being protected, e.g., a curved sheath for the protection of pipelines, as long as an air space or spacing is provided between the outer surface of the equipment and the protective sheath. The air space in-between the protective sheath and the equipment has an average thickness of at least ⅛" in one embodiment, at least ¼" in a second embodiment, and at least 2" in a third embodiment. The dimension of the air space depends on a number of factors, including but not limited to the dimensions of the equipment being protected, the properties of the fluid being contained, the process conditions, e.g., amount of heat expected to be generated by the process fluid, environment factors such as climate condition, sun exposure and direction.

The protective sheath in one embodiment comprises a plurality of pieces when put together, slightly larger than the equipment to provide an air space (gap) and conforming to the shape of the equipment, e.g., two half pipe shaped sheath sections for protecting a pipe section with each sheath section having an inside diameter sufficient larger than the outside diameter of the pipe to create an air gap of at least ⅛" between the sheath and the pipe. The number of pieces/sections forming the protective sheath depends on the size of the equipment to be covered, the material of construction for the sheath, the location of the equipment, whether the sheath is for an existing installation, among other factors. In one embodiment for the protection of a small piece of equipment or pipe, or with the use of sufficiently flexible material for the protective sheath, the sheath can be a single piece. An installer can pull or spread the opposite seams of the sheath apart, allowing the sheath to be slipped over the equipment piece to be protected.

In one embodiment, the sheath sections are structured such that after installation, a gap of at least ⅛" is formed along a length of the sheath (and the equipment such as a pipe), allowing for the free flow of air around the protected equipment. In a second embodiment, the gap is at least ¼". In one embodiment with the use of two half sections forming a protective sheath, the sheath has two gaps positioned on opposite sides and running longitudinally along the length of the sheaths.

In one embodiment, the gap is formed by positioning two seams (edges) of two sheath sections (or opposite seams of an open-pipe shaped section) in an overlapping relationship and leaving a space between the two overlapped seams to form the gap. In yet another embodiment, the gap is formed by bending or shaping the seam at an angle to the contour or the body of the sheath, e.g., 90°, such that two seams in adjacent (e.g., abutting) still define an opening in-between the adjacent seams forming the gap. The gap in-between the seams can be kept open with the use of appropriate spacers, retaining clips, bolts, etc., holding the seams together to retain the sheath in place while still leaving the open gap for heat dissipation/air ventilation. In one embodiment, opposing seams of the sheath are fastened together with the use of bolts/nuts, with spacers being used for keeping the gap open. In yet another embodiment, the sheath is provided with a plurality of spaced-apart fingers (e.g., projections or tabs) on one seam, with the seam on the opposite side being provided with a plurality of corresponding spaced openings. Once the fingers pass through the openings, the fingers are bent back forming interlocks that secure the sheath around the equipment.

In one embodiment, the gap runs at least a portion of the length of the protective sheath. In another embodiment, the gap is at least ¼" wide and runs at least one half the length of the protective sheath. In yet another embodiment, the gap is between ⅛" to 1" in width and runs the entire length of the protective sheath. In one embodiment, instead of or in addition to gap(s) formed in between the seams of the sheath section(s), the sheath is provided with a plurality of side openings for air flow around the protected equipment. In one embodiment, the side openings are in the form of slits positioned along the length of the protective sheath.

In one embodiment for fire protection, the area adjacent to the gap, e.g., the seam areas defining the gaps or the side openings, is coated with an intumescent material. In yet another embodiment, the inside surface area of the protective sheath is coated with an intumescent layer. The intumescent material expands to its effective thermal dimension (e.g., thickness) when exposed to high temperatures, effectively closing the gap or the side openings and block radiant heat. An "effective" thermal dimension is a dimension which the intumescent material fully expands when heated, e.g., from 300° F. to 1200° F. The effective dimension ranges at least 3 to 15 of the initial dimension of the intumescent material prior to heat exposure. In another embodiment, an intumescent adhesive pad is applied onto the seam areas defining the gaps or the side openings. In yet another embodiment, moldable intumescent sealant (or putty) is applied onto the seam areas of the gaps or the side openings.

With the application of intumescent pads for fire protection, the gap remains open during normal operating conditions and closed in a fire due to the expansion of the intumescent coating (or pad). If there is a fire from the equipment containing process fluids, surrounding structure may catch on fire if an intense heat were to spread from equipment without a protective sheath that would close up in a fire. Conversely, in the event of a fire from the outside of the equipment, it may be desirable to fire protect the equipment with the sheath to help prevent fire from reaching inside. In such a fire event, the system temperature increases as the result, but the protective sheath is expected to provide the equipment and the fluid contained within protection from both radiation and convective heat transfer.

In embodiments for fire protection, the intumescent material can be pre-applied prior to installation of the sheath on the equipment, or applied after installation after the sheath on the equipment. The intumescent material is applied such that the gap substantially closes or filled with the expanded intumescent material. Those skilled in the art may modify how the intumescent material is applied on the seams forming the gap, for example, a checkerboard application may be used so that in a fire, the intumescent material expands in all dimensions closing the gaps between pieces of intumescent pads as well as the gaps between the overlapping seams of adjacent sheaths, or adjacent sheath sections.

In one embodiment, intumescent coatings (or pads) are applied onto all seam areas to ensure that all gaps are closed in the event of a fire. In another embodiment, intumescent materials are selectively applied to some gaps only, e.g., the gap at the bottom (base) and not the gap at the top of the protective sheath for an overhead pipe system. The closure of the bottom gap protects the equipment from fire encroachment that may be spread from equipment and surround areas underneath the pipe system. In yet another embodiment where UV protection/heat dissipation is a priority instead of fire protection, the gaps are left open without any intumescent application.

In one embodiment, a plurality of spacers are positioned in-between the sheath and the outer surface of the pipe to be protected. The spacers can be constructed out of wood, plastic, metal, adhesive material, intumescent material, etc. The spacers can be constructed as an integral part of the sheath or as extra pieces to be applied between the sheath and the equipment. The spacers can be randomly spaced, or they can be positioned in locations that would provide rigidity to the sheath, means to attach the sheath to the equipment being protected within and/or the most structural support for the sheath, defining the amount of desired air space in between the sheath and the equipment being protected.

In one embodiment for the protection of pipelines, where a section pipeline intersects with thoroughfare, the gaps are positioned half-way on the curvature of the sheath cover of the pipe to allow air circulation without fluid leakage to the thoroughfare below. In this embodiment, a drainage pipe is optionally provided for connection to the sheath, allowing the draining of any rainwater or process fluid to the ground. In another embodiment, at least one of the gaps is positioned at the bottom of the sheath curvature to allow for the free draining of rainwater or process fluid should the pipe leak.

In one embodiment for the general protection of structural components such as vessels and the like with a non-insulating protective sheath with an air space between the equipment and the protective sheath, air flow inlets are formed via the gaps (and/or side holes) in bottom area of the protective sheath. Heat is dissipated from (or prevented from being entrapped in) the equipment via a chimney effect. The protective sheath draws air in through the air flow inlets, e.g., gaps located at the base or bottom of the sheath. The air flow is passed over the protected equipment heated by convection. In the process, the air is heated such that it rises and exits out through the outlet(s) formed in the gaps (and/or side holes) near or at the top of the sheath/equipment being protected. As opposed to prior art embodiments that entrap heat, heat is effectively dissipated with the chimney effect created in the protective sheath, i.e., the pulling-in and directing of air flow through the gaps or side holes in the sheath. Therefore with the protective sheath, the temperature on the skin (outer surface) of the equipment carrying a hot process fluid remains considerably lower than that of the process fluid. Depending on the temperature of the process fluid as well as the prevailing ambient temperature, in one embodiment the temperature on the outer surface of the equipment is between 5 to 30° C. above the prevailing ambient temperature. Besides providing heat dissipating protection, in one embodiment, the protective sheath also provides UV/rigidity protection for equipment, prolonging the life of the equipment.

The protective sheath in one embodiment is made out of metallic sheet material such as stainless steel or carbon steel for fire protection. In other embodiments, e.g., for heat dissipation, UV resistance protection, shading, mechanical protection, rigidity enforcement, etc., the protective sheath can be constructed out of non-metallic materials such as plastics and the like. The protective sheath may be formed of many pieces attached together in a longitudinal direction (for a pipe system) or in other manners such that there are extending or overlapping seams between each piece, providing a protective sheath for the entire system. The different sheath sections can be constructed out of the same or different materials, depending on the particular piece of equipment in system to be protected, e.g., its location, the process fluid being contained or transported in the particular piece of equipment in the system, its location, etc. The sheath sections can be attached to one another or secured to the underlying equipment and/or supporting structure using straps, pins, etc. or other securing mechanisms known in the art. In one embodiment after a fire and depending on the extent of the damage, the sheath can be replaced and/or recoated with new intumescent coating or pads at the gap area. The sheath can also be removed from one piece of equipment and retrofit for installation on another piece of equipment.

In one embodiment, a protective sheet made out of stainless steel is employed to provide fire protection for a composite pipe system, particular a pipe system for containing flammable fluids such as petroleum products. A loss of containment in any portion of the piping system may result in a high temperature, high heat flux, high velocity flame, or a jet fire. In a jet fire, the temperature of the fire increases continuously and can be at 900° C. after 60 minutes, about 1050° C. after 120 minutes, and up to 1150° C. after 240 minutes. With the opening gaps in the fire protective sheath quickly close up in a fire, the composite pipe system is characterized as meeting level II fire endurance standard according to the test method specified in the International Maritime Association (IMO A753, adopted Nov. 4, 1993), i.e., the pipe can endure a fully developed a hydrocarbon fire for a long duration without loss of integrity under dry conditions. In one embodiment, it takes at least 45 minutes before the inside diameter of the composite pipe in a system with the fire protective stainless sheath to reach 190° C. under the conditions of the IMO A753 test.

Figures Illustrating Embodiments: Reference will be made to the figures to further illustrate embodiments of the invention. The figures illustrate the invention by way of example and not by way of limitation, such as limiting the equipment and shapes to sections of pipes as illustrated, or to the exact fastening arrangements as illustrated.

FIG. 1 is a perspective view of a pipe section 30 including an embodiment of a protective sheath. The protective sheath comprises two separate sections 10 and 20 each with seams 11 and 21 respectively, overlapping forming the air space 15. Facing surfaces of the seams are lined with intumescent pads 11 and 22, which under heated conditions will expand to completely close the air space 15. Although not shown, the sheath includes retaining clips to secure and/or maintain the seams in position, keeping the air space 15 open for air ventilation. In one embodiment (not shown), the protective sheath is provided with one strip of intumescent pad for lining one seam only. In another embodiment (not shown), the strip is lined on a seam on an intermittent and not continuous basis.

FIG. 2 is a cross-section view of the pipe section of FIG. 1, further showing spacers 14 and 24 which provides structural support for the protective sheath as it is installed over the pipe section 30. In one embodiment, the spacers can be employed to prop the seams separate keeping the air space 15 open for ventilation.

FIG. 3 is a perspective view of a pipe section in a second embodiment of a fire-protective sheath. In this embodiment, the seams 11 and 21 are bent at a 90° angle with respect to the curvature of the sheath sections 10 and 20, leaving an open gap 15 for air ventilation. The facing surfaces of bent sections 11 and 12 are lined with intumescent pads 11 and 12. The sheath includes threaded bolts 23 (or retaining clips not shown) to maintain an open air space 15. In one embodiment (not shown), only one seam is lined with an intumescent pad on a continuous or intermittent basis.

FIG. 4 is a cross-section view of the pipe section of FIG. 3, further showing spacers 14 and 24 which provides structural support for the protective sheath.

FIG. 5 is a perspective view of another embodiment of a protective sheath 10 as a single section, provided with a number of tabs 11 on one seam and corresponding holes 21 on the opposite seam. The holes 21 are optionally provided with intumescent pads 22 partially covering the holes, while still leaving sufficient opening for the tabs to pass through. In one embodiment as shown, intumescent pads 12 are provided on some of the projection tabs. Also as shown, the sheath is provided with an air space or slit 15, which is provided with a plurality of spaced apart intumescent adhesive pads 16. In the event of a fire, the intumescent pads expand to cover the holes 21 as well as the slit 15.

FIG. 6 is a perspective view of the protective sheath in FIG. 5 after assembly. As shown, after the tabs pass through the spaced apart holes 21, the fingers 11 are bent back forming interlocks that secure the sheath around the equipment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A system for containing a petroleum product, comprising:
    at least a structural component for containing the petroleum product;
    a protective sheath disposed around the structural component, forming an air space of at least ¼" between the structural component and the protective sheath, the protective sheath having at least two gaps including a first gap and a second gap;
    wherein the gaps are sufficiently spaced apart to allow air flowing into the first gap through the air space and out of the second gap to dissipate heat from the hot fluid contained within the structural component; and
    a sufficient amount of intumescent material applied in an area adjacent to at least one of the gaps, wherein the intumescent material expands when heated to a temperature between 300 to 1200° F. to effectively close the at least one of the gaps.

2. A system for containing a petroleum product, comprising:
    at least a structural component for containing the petroleum product;
    a protective sheath disposed around the structural component, forming an air space of at least ¼" between the structural component and the protective sheath, the protective sheath having at least two gaps including a first gap and a second gap;
    wherein the gaps are sufficiently spaced apart to allow air flowing into the first gap through the air space and out of the second gap to dissipate heat from the hot fluid contained within the structural component; and
    a sufficient amount of intumescent material applied in areas adjacent to the first gap and the second gap, wherein the intumescent material expands when heated to a temperature between 300 to 1200° F. in a fire to effectively close the gaps.

3. The system of claim 2, wherein the intumescent material is selected from an adhesive, a sealant, and a putty.

4. A system for containing a petroleum product, comprising:
    at least a structural component for containing the petroleum product;

a protective sheath disposed around the structural component, forming an air space of at least ¼" between the structural component and the protective sheath, the protective sheath having at least two gaps including a first gap and a second gap;

wherein the gaps are sufficiently spaced apart to allow air flowing into the first gap through the air space and out of the second gap to dissipate heat from the hot fluid contained within the structural component;

wherein the structural component is in the form of a composite pipe and wherein the system can endure a fully developed hydrocarbon fire for a long duration without a loss of integrity under dry conditions.

5. The system of claim 4, wherein it takes at least 45 minutes before the composite pipe reaches 190° C. internally in a fire wherein the intumescent material expands to an effective thermal dimension in the fire.

6. A system for containing a petroleum product, comprising:

at least a structural component for containing the petroleum product;

a protective sheath disposed around the structural component, forming an air space of at least ¼" between the structural component and the protective sheath, the protective sheath having at least two gaps including a first gap and a second gap;

wherein the gaps are sufficiently spaced apart to allow air flowing into the first gap through the air space and out of the second gap to dissipate heat from the hot fluid contained within the structural component; and wherein the protective sheath comprises at least two sections with each having a seam, and wherein the seams overlap defining an open space forming at least one of the gaps.

7. The system of claim 6, further comprising a plurality of retaining clips for holding the seams in place to define the open space forming the at least one of the gaps.

8. A system for containing a petroleum product, comprising:

at least a structural component for containing the petroleum product;

a protective sheath disposed around the structural component, forming an air space of at least ¼" between the structural component and the protective sheath, the protective sheath having at least two gaps including a first gap and a second gap;

wherein the gaps are sufficiently spaced apart to allow air flowing into the first gap through the air space and out of the second gap to dissipate heat from the hot fluid contained within the structural component; and wherein the protective sheath comprises at least two opposing seams, a first seam and a second seam, with the first seam comprising a plurality of spaced-apart tabs and the second seam comprising a plurality of corresponding spaced slots, and wherein the spaced apart tabs are configured to be extended through the spaced slots and bent back to secure the protective sheath around the structural component.

9. A composite pipe system for carrying petroleum products, comprising:

at least a composite pipe for carrying the petroleum products;

a protective sheath disposed around the composite pipe, forming an air space of at least ¼" between the composite pipe and the protective sheath, the protective sheath comprising at least two half-pipe sections, and wherein each half-pipe section has two opposite seams each shaped at an angle such that the shaped seams from the two half-pipe sections in adjacent position define a first gap and a second gap running a lateral full length of the protective sheath;

intumescent material applied onto at least one opposite shaped seam defining a first gap and at least one opposite shaped seam defining a second gap; and wherein air flows into the first gap passes through the air space and out of the second gap to dissipate heat built-up in the pipe system; and wherein the intumescent material expands when heated to a temperature in a fire at an elevated temperature between 300 to 1200° F. to effectively close the gaps and protect the composite pipe from the fire.

10. A composite pipe system for carrying petroleum products, comprising:

at least a composite pipe for carrying the petroleum products;

a protective sheath disposed around the composite pipe, forming an air space of at least ¼" between the composite pipe and the protective sheath, the protective sheath comprising at least two half-pipe sections each having two opposite seams, the half pipe sections overlap at the seams forming two gaps, a first gap and a second gap running a lateral full length of the protective sheath;

intumescent material applied onto at least one opposing seam forming a first gap and at least one opposing seam forming a second gap; and wherein air flows into the first gap passes through the air space and out of the second gap to dissipate heat built-up in the pipe system; and wherein the intumescent material expands when heated to a temperature in a fire at an elevated temperature between 300 to 1200° F. to effectively close the gaps and protect the composite pipe from the fire.

* * * * *